United States Patent
Kusano (10) Patent No.: US 6,978,869 B2
(45) Date of Patent: Dec. 27, 2005

(54) MASTER CYLINDER WITH A BRAKING STROKE SIMULATOR

(75) Inventor: Akihito Kusano, Toyota (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/826,332

(22) Filed: Apr. 19, 2004

(65) Prior Publication Data

US 2004/0227397 A1 Nov. 18, 2004

(30) Foreign Application Priority Data

May 15, 2003 (JP) .............................. 2003-137376

(51) Int. Cl.[7] .......................................... B60T 11/236
(52) U.S. Cl. ....................................... 188/152; 60/552
(58) Field of Search ........................... 188/151 R, 152, 188/355, 356, 357, 358, 359, 360; 303/113.4, 303/114.1, 114.2, 114.3; 60/552, 554

(56) References Cited

U.S. PATENT DOCUMENTS

| | | | |
|---|---|---|---|
| 6,183,049 B1 * | 2/2001 | Oka et al. ................. | 303/114.1 |
| 6,729,698 B2 * | 5/2004 | Kusano et al. .............. | 188/352 |
| 6,789,857 B2 * | 9/2004 | Kusano ................... | 303/114.1 |
| 2004/0189087 A1 * | 9/2004 | Kusano ................... | 303/114.1 |

FOREIGN PATENT DOCUMENTS

| | | | |
|---|---|---|---|
| JP | 11-59349 | 3/1999 | |
| JP | 2000177562 A | * 6/2000 | ............. B60T 8/40 |

* cited by examiner

*Primary Examiner*—Thomas Williams
(74) *Attorney, Agent, or Firm*—Buchanan Ingersoll PC

(57) ABSTRACT

The present invention is directed to a master cylinder having a braking stroke simulator, wherein a master piston is slidably accommodated in a housing having an atmospheric pressure chamber and a master pressure chamber, and a simulator piston is slidably accommodated in the housing to define a simulator chamber. An elastic member is provided for applying a stroke of the simulator piston in response to braking operation force applied to a manually operated braking member. Thus, the braking stroke simulator transmits the braking operation force to the master piston through the simulator piston and elastic member. A cut-off seal member is disposed in the housing for supporting the master piston, and placed to be applied with the pressure in the master pressure chamber in front of it and applied with the atmospheric pressure behind it. And, a passage is formed in the master piston to communicate the simulator chamber with the atmospheric pressure chamber when the master piston is placed in its initial position. The cut-off seal member is positioned relative to the passage to block the communication between the simulator chamber and the atmospheric pressure chamber, when the master piston is advanced by a predetermined stroke from the initial position.

5 Claims, 6 Drawing Sheets

MASTER CYLINDER WITH A BRAKING STROKE SIMULATOR

This application claims priority under 35 U.S.C. Sec. 119 to No. 2003-137376 filed in Japan on May 15, 2003, the entire content of which is herein incorporated by reference.

BACKGROUND OF THE INVENTION

1. Field of the Invention

The present invention relates to a master cylinder for use in a hydraulic brake apparatus of a vehicle, and more particularly to a master cylinder with a braking stroke simulator operated in response to operation of a manually operated braking member.

2. Description of the Related Arts

Heretofore, there is known various hydraulic brake apparatuses each having a master cylinder with a braking stroke simulator. Among them, such an apparatus as discussed below has been disclosed in Japanese Patent Laid-open publication No. 11-59349. According to the apparatus, when a pressure control device including a pressure source is normal, the hydraulic pressure generated by the pressure source is controlled by the pressure control device in response to operation of a manually operated braking member to be supplied into wheel brake cylinders, with the communication between the master cylinder and the wheel brake cylinder being blocked. When the pressure control device has come to be abnormal, the master cylinder is communicated with the wheel brake cylinder, to discharge the hydraulic pressure into the wheel brake cylinder in response to operational force of the manually operated braking member.

According to the hydraulic brake apparatus as described above, the stroke simulator is adapted to provide the manually operated braking member with a stroke in response to the braking operation force, when the pressure control device is normal, i.e., when the communication between the master cylinder and the wheel brake cylinder has been blocked. And, according to the hydraulic brake apparatus as disclosed in the Japanese Patent Laid-open publication, the stroke simulator is disposed between the manually operated braking member and a master piston. In view of the fact that it is required to provide a large stroke of a brake pedal in response to a stroke of the stroke simulator, when the pressure control device is abnormal, i.e., when the hydraulic pressure is supplied from the master cylinder to the wheel brake cylinder, there is provided a seal member which serves as cut-off means for blocking the communication between a simulator chamber and an atmospheric pressure chamber in response to movement of the master piston. With the seal member acting as the cut-off means properly, the stroke of the stroke simulator may be restricted, when the hydraulic pressure is supplied from the master cylinder to the wheel brake cylinder.

According to the hydraulic brake apparatus as disclosed in the Japanese Patent Laid-open publication, however, even if the seal member could not act as the cut-off means sufficiently, any abnormality could not be detected as far as the pressure control device is normal. Therefore, it is required to provide the manually operated braking member with a large stroke, when the pressure control device is abnormal. In view of reliability of the seal member acting as the cut-off means, a further improvement is required. As the stroke simulator is disposed behind the master piston according to the apparatus as disclosed in the Japanese Patent Laid-open publication, the longitudinal length of the master cylinder is made long, so that it is insufficient to fulfill the requirement for minimizing the master cylinder as a whole.

SUMMARY OF THE INVENTION

Accordingly, it is an object of the present invention to provide a master cylinder having a braking stroke simulator used for a component of a hydraulic brake apparatus for a vehicle, which is provided with a seal member of a highly reliable cut-off property whose function can be monitored properly, and which is capable of reducing a longitudinal length of the master cylinder.

In order to accomplish the above and other objects, the master cylinder is provided with a braking stroke simulator operated in response to operation of a manually operated braking member, and provided with a master piston slidably accommodated in a housing having an atmospheric pressure chamber defined therein for storing brake fluid under atmospheric pressure, and a master pressure chamber defined in front of the master piston for generating a hydraulic braking pressure, and provided with a simulator piston slidably accommodated in the housing to define a simulator chamber in front of the simulator piston, and moved back and forth in response to operation of the manually operated braking member. An elastic member is provided for applying a stroke of the simulator piston in response to braking operation force applied to the manually operated braking member, to provide the braking stroke simulator together with the simulator piston, whereby the braking stroke simulator is adapted to transmit the braking operation force of the manually operated braking member to the master piston through the simulator piston and the elastic member. A cut-off seal member is disposed in the housing for supporting the master piston therein slidably and fluid-tightly, and placed to be applied with the pressure in the master pressure chamber in front of the cut-off seal member, and applied with the pressure in the atmospheric pressure chamber behind the cut-off seal member. And, a passage is formed in the master piston to communicate the simulator chamber with the atmospheric pressure chamber when the master piston is placed in an initial position thereof. The cut-off seal member is positioned relative to the passage to block the communication between the simulator chamber and the atmospheric pressure chamber, when the master piston is advanced by a predetermined stroke from the initial position or more.

In the master cylinders as described above, preferably, the simulator piston is slidably received in the master piston to be moved relative thereto.

The cut-off seal member may be placed to define an annular chamber around the master piston in front of the cut-off seal member, and the annular chamber may be communicated with the master pressure chamber.

The master cylinder may be provided with a braking stroke simulator operated in response to operation of a manually operated braking member, and may include a master piston slidably accommodated in a housing having an atmospheric pressure chamber defined therein for storing brake fluid under atmospheric pressure, and a master pressure chamber defined in front of the master piston for generating a hydraulic braking pressure, and provided with a simulator piston slidably accommodated in the housing to define a simulator chamber in front of the simulator piston, and moved back and forth in response to operation of the manually operated braking member. An elastic member is provided for applying a stroke of the simulator piston in response to braking operation force applied to the manually operated braking member, to provide the braking stroke simulator together with the simulator piston, whereby the braking stroke simulator is adapted to transmit the braking operation force of the manually operated braking member to the master piston through the simulator piston and the elastic member. And, a cut-off seal member is disposed in the housing for supporting the master piston therein slidably and fluid-tightly, and placed to be applied with the pressure in the master pressure chamber in front of the cut-off seal member, and applied with the pressure in the atmospheric pressure chamber behind the cut-off seal member. A first passage may be formed in the master piston to communicate the master pressure chamber with the atmospheric pressure chamber when the master piston is placed in an initial position thereof. The cut-off seal member may be positioned relative to the first passage to block the communication between the master pressure chamber and the atmospheric pressure chamber, when the master piston is advanced by a first stroke from the initial position or more. And, a second passage may be formed in the master piston to communicate the simulator chamber with the atmospheric pressure chamber when the master piston is placed in the initial position thereof. The cut-off seal member may be positioned relative to the second passage to block the communication between the simulator chamber and the atmospheric pressure chamber, when the master piston is advanced by a second stroke from the initial position or more, wherein the second stroke is greater than the first stroke. Preferably, the simulator piston is slidably received in the master piston to be moved relative thereto.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
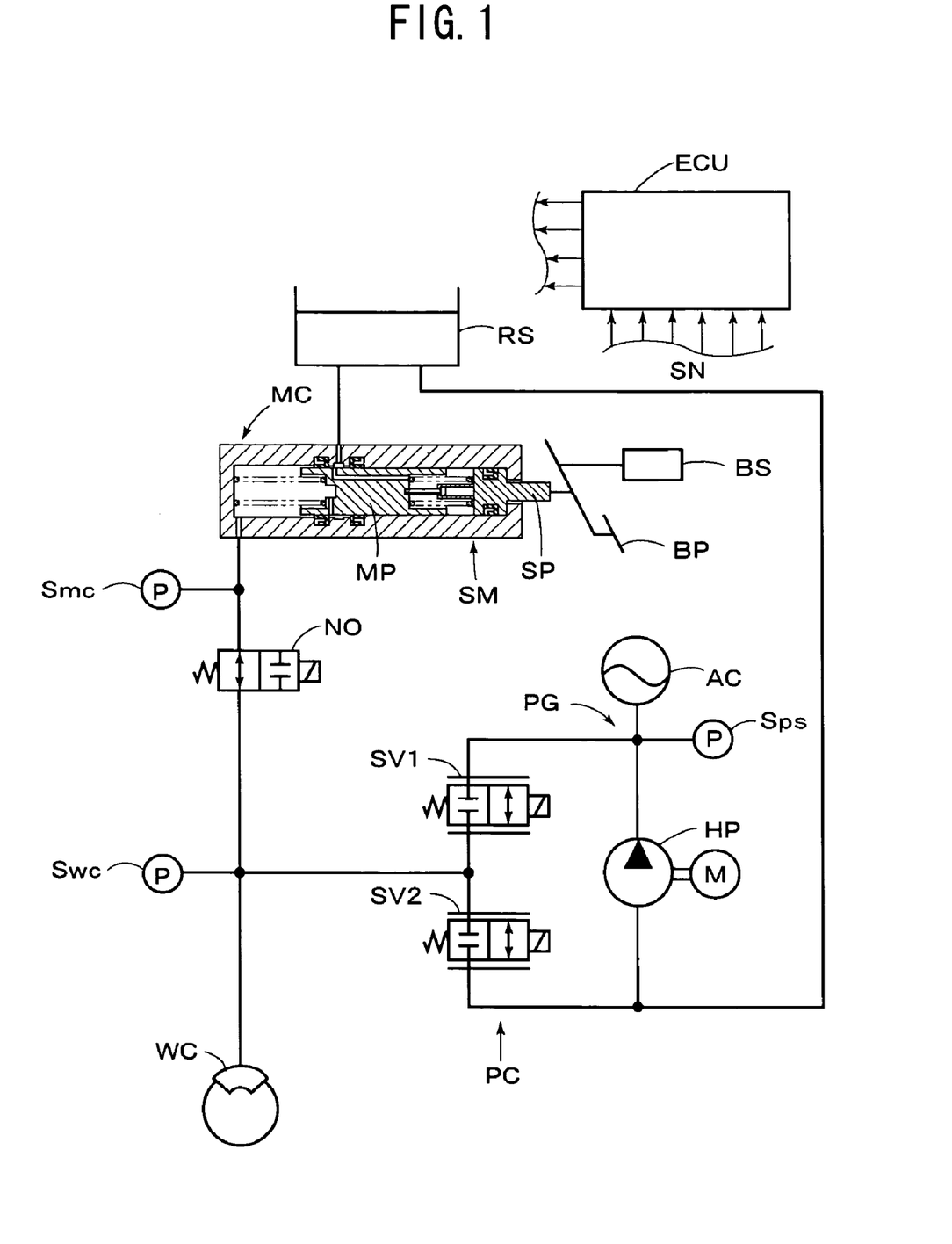
FIG. 1 is a schematic block diagram of a hydraulic brake apparatus having a master cylinder with a braking stroke simulator according to an embodiment of the present invention.

Referring to FIG. 1, there is illustrated a hydraulic brake apparatus for a vehicle having a master cylinder with a braking stroke simulator according to an embodiment of the present invention, which includes a master cylinder for generating hydraulic pressure in response to operation of a brake pedal BP, which is served as a manually operated braking member, i.e., braking operation by a vehicle driver. The apparatus includes wheel brake cylinders (indicated by WC), each of which is operatively mounted on each wheel of the vehicle, to apply braking force to the wheel with the hydraulic pressure fed from the master cylinder MC. And, a normally open electromagnetic switching valve NO is disposed between the master cylinder MC and the wheel brake cylinder WC. Furthermore, a pressure source PG for generating a certain hydraulic pressure irrespective of the braking operation of the vehicle driver is connected to a hydraulic passage between the switching valve NO and the wheel brake cylinder WC.

According to the present embodiment, the pressure source PG includes an electric motor M controlled by an electronic control unit ECU, and a hydraulic pressure pump HP, which is driven by the electric motor M, and whose inlet is connected to a reservoir under atmospheric pressure RS (hereinafter, simply referred to as a reservoir RS), and whose outlet is connected to an accumulator AC. According to the present embodiment, a pressure sensor Sps is connected to the outlet, and the detected pressure is monitored by the electronic control unit ECU. On the basis of the monitored result, the motor M is controlled by the electronic control unit ECU to keep the hydraulic pressure in the accumulator AC between predetermined upper and lower limits. The accumulator AC is connected to a hydraulic passage between the switching valve NO and the wheel brake cylinder WC, through a first linear solenoid valve SV1 of a normally closed type, to regulate the hydraulic pressure discharged from the pressure source PG and supply it to the wheel brake cylinder WC. Also, the reservoir RS is connected to the hydraulic passage between the switching valve NO and wheel brake cylinder WC, through a second linear solenoid valve SV2 of a normally closed type, to reduce the pressure in the wheel brake cylinder WC and regulate it. Accordingly, a pressure control device PC is formed by the pressure source PG, first and second linear solenoid valves SV1 and SV2, electronic control unit ECU, and sensors as described hereinafter.

According to the present embodiment, a pressure sensor Smc is disposed in a hydraulic passage between the master cylinder MC and the switching valve NO, and a pressure sensor Swc is disposed in a hydraulic passage between the switching valve NO and the wheel brake cylinder WC. On the brake pedal BP, a stroke sensor BS is operatively connected to detect its stroke. The signals detected by the sensors as described above are fed to the electronic control unit ECU. Thus, the hydraulic braking pressure discharged from the master cylinder MC, the hydraulic braking pressure in the wheel brake cylinder WC and the stroke of the brake pedal BP are monitored. Furthermore, in order to achieve those controls including an anti-skid control or the like, sensors SN such as wheel speed sensors, acceleration sensor or the like have been provided, so that the signals detected by them are fed to the electronic control unit ECU.

Figure 2:
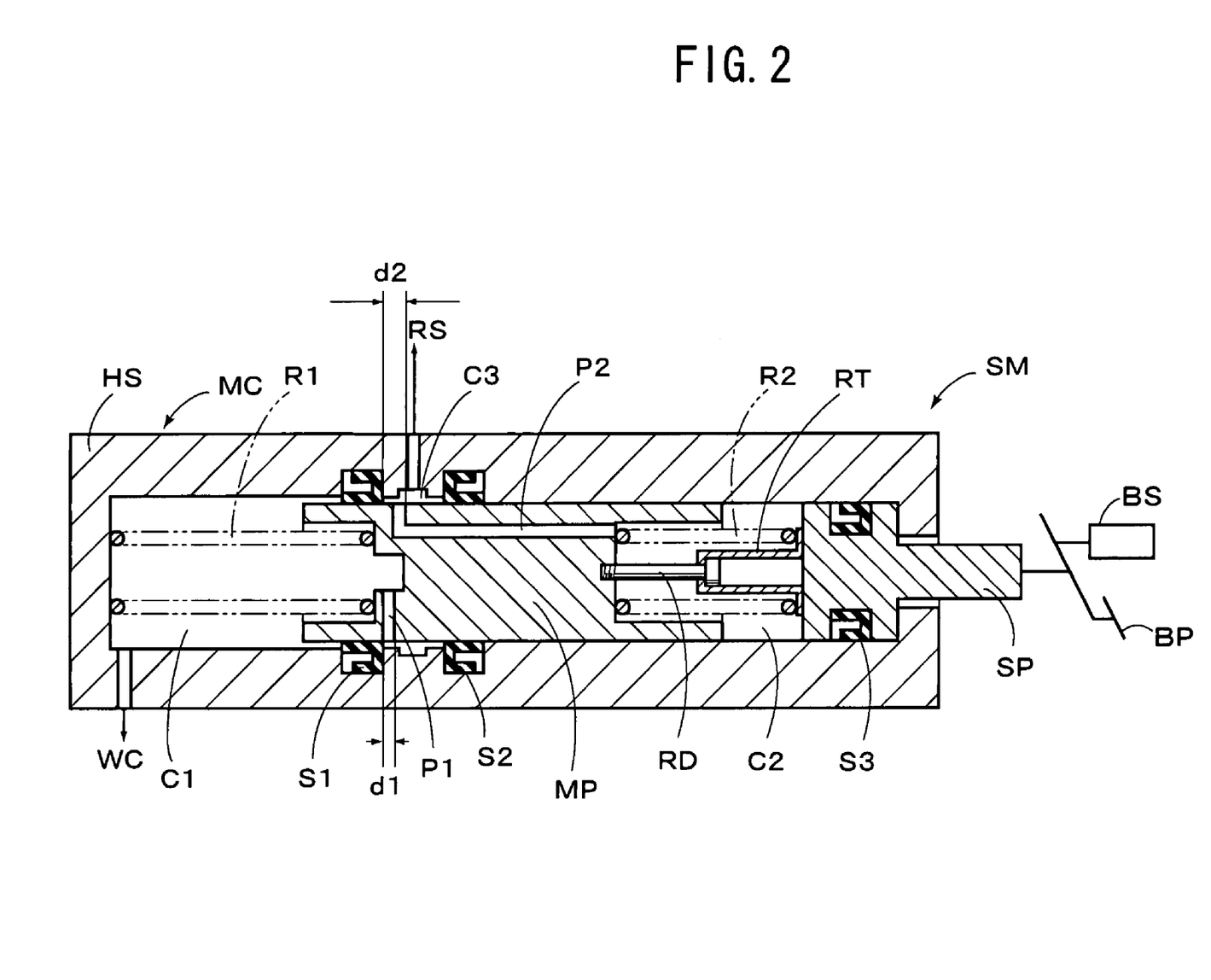
FIG. 2 is a sectional view of a master cylinder with a braking stroke simulator according to an embodiment of the present invention.

As enlarged in FIG. 2, the master cylinder MC of the present embodiment includes a master piston MP which is slidably accommodated in a cylinder housing HS, and in front of which a master pressure chamber C1 is defined to communicate with the wheel brake cylinder WC, through the switching valve NO as described before. In the master pressure chamber C1, a return spring R1 of compression spring is accommodated to bias the master piston MP rearward. A simulator piston SP is slidably accommodated in the cylinder housing HS to define a simulator chamber C2 in front of the simulator piston SP. The simulator piston SP is moved back and forth in response to operation of the brake pedal BP served as the manually operated braking member, so that a stroke of the simulator piston SP is provided in response to the braking operation force applied to the brake pedal BP, by means of a compression spring R2 served as the elastic member. Thus, the stroke simulator SM is constituted, to transmit the operation force of the brake pedal BP to the master piston MP through the compression spring R2 and the simulator piston SP. According to the present embodiment, the compression spring R2 is disposed between a rod RD fixed to the master piston MP and a retainer RT whose front end portion is slidably engaged with the rod RD, and whose rear end portion abuts on the simulator piston SP, whereby a maximal distance between the master piston MP and the simulator piston SP is provided.

As shown in FIG. 2, the master piston MP is slidably and fluid-tightly supported in the cylinder housing HS thorough a seal member S1 served as the cut-off seal member and a seal member S2, and the simulator piston SP is slidably and fluid-tightly supported in it thorough a seal member S3. According to the present embodiment, the seal members S1 and S2 are held respectively in a couple of annular grooves, which are formed in parallel with each other around the inner peripheral surface of the cylinder housing HS. An atmospheric pressure chamber C3 is formed between the outer surface of the master piston MP and the inner peripheral surface of the cylinder housing HS, and between the seal members S1 and S2, to be communicated with the reservoir RS. Although the cylinder housing HS is illustrated as one body in FIGS. 1 and 2 to be understood easily, it is formed with a plurality of cylindrical members assembled together in practice.

In the master piston MP, there is formed a first passage P1 as shown in FIG. 2, so that the master pressure chamber C1 is communicated with the atmospheric pressure chamber C3 through the first passage P1, when the master piston MP is placed in an initial position thereof, and the seal member S1 is positioned relative to the first passage P1 to block the communication between the master pressure chamber C1 and the atmospheric pressure chamber C3, i.e., the opening end of the first passage P1 is closed by the seal member S1, when the master piston MP is advanced by a first stroke (d1) from the initial position or more. Also, in the master piston MP, there is formed a second passage P2 as shown in FIG. 2, so that the simulator chamber C2 is communicated with the atmospheric pressure chamber C3 when the master piston MP is placed in the initial position thereof, and the seal member S1 is positioned relative to the second passage P2 to block the communication between the simulator chamber C2 and the atmospheric pressure chamber C3, i.e., the opening end of the second passage P2 is closed by the seal member S1, when the master piston MP is advanced by a second stroke (d2) which is greater than the first stroke (d1), from the initial position or more.

Hereinafter, explained is operation of the hydraulic brake apparatus having the master cylinder MC as constituted above, when the pressure control device PC is normal. If the brake pedal BP is depressed, its stroke is detected by the stroke sensor BS, and the hydraulic pressure discharged from the master cylinder MC is detected by the pressure sensor Smc. When these signals are fed to the electronic control unit ECU, the switching valve NO is energized to be placed in its closed position, so that the communication between the master pressure chamber C1 and the wheel brake cylinder WC is blocked. In the electronic control unit ECU, a desired (target) wheel cylinder pressure is calculated on the basis of the detected stroke of the brake pedal BP and the detected hydraulic pressure discharged from the master cylinder MC. Then, the electric current fed to the first and second linear solenoid valves SV1 and SV2 respectively is controlled, so that the wheel cylinder pressure detected by the pressure sensor Swc equals to the desired wheel cylinder pressure. Consequently, the hydraulic pressure controlled by the pressure control device PC in response to operation of the brake pedal BP is supplied to the wheel brake cylinder WC.

In the case where the pressure control device PC is normal as described above, the master cylinder MC operates as follows. When the brake pedal BP is depressed, the braking operation force is transmitted to the master piston MP through the simulator piston SP and the elastic member (compression spring R2), so that the master piston MP is advanced against the biasing force of the return spring R1. When the master piston MP is advanced by the first stroke (d1) from the initial position, the opening end of the first passage P1 is closed by the seal member S1, so that the communication between the master pressure chamber C1 and the atmospheric pressure chamber C3 is blocked. Therefore, when the brake pedal BP is depressed further, the hydraulic pressure is generated in the master pressure chamber C1 in response to the braking operation force. In this case, the switching valve NO has been energized (turned on) to be placed in its closed position, so that the communication between the master pressure chamber C1 and the wheel brake cylinder WC has been blocked. Therefore, the master pressure chamber C1 becomes a closed chamber, whereby the master piston MP will not be advanced, even if further braking operation force is applied to the brake pedal BP. In this state, the moved distance of the master piston MP is smaller than the second stroke (d2), so that the simulator chamber C2 has been communicated with the atmospheric pressure chamber C3. Accordingly, if the braking operation force applied to the simulator piston SP is equal to or greater than a compressive force for mounting the compression spring R2 in the stroke simulator SM, the compression spring R2 is compressed to provide the stroke of the simulator piston SP in response to the braking operation force. As a result, the stroke of the brake pedal BP is provided in response to the braking operation force.

On the contrary, in the case where the pressure control device PC including the pressure source PG and the like comes to be abnormal, the switching valve NO is de-energized (turned off) to be placed in its open position, so that the master pressure chamber C1 and the wheel brake cylinder WC are communicated with each other. At the same time, the first and second linear solenoid valves SV1 and SV2 are de-energized (turned off) to be placed in their closed positions, respectively, so that the hydraulic pressure is not supplied from the pressure source PG to the wheel brake cylinder WC. In this state, therefore, when the brake pedal BP is depressed, the hydraulic pressure is supplied from the master cylinder MC to the wheel brake cylinder WC. Consequently, the braking force is maintained, even if the pressure control device PC came to be abnormal. When the pressure control device PC has come to be abnormal, the master cylinder MC operates as follows. When the brake pedal BP is depressed, and the master piston MP is advanced by the first stroke (d1) from the initial position, the communication between the master pressure chamber C1 and the atmospheric pressure chamber C3 is blocked, in the same manner as in the case where the pressure control device PC is normal.

In the case where the pressure control device PC comes to be abnormal, however, the master pressure chamber C1 is communicated with the wheel brake cylinder WC, through the switching valve NO placed in its open position. Accordingly, if the brake pedal BP is operated further, the hydraulic pressure in the master pressure chamber C1 is supplied to the wheel brake cylinder WC, to advance the master piston MP further. Consequently, when the master piston MP is advanced to a position forward of the initial position by the second stroke (d2), the opening end of the second passage P2 is closed by the seal member S1, so that the communication between the simulator chamber C2 and the atmospheric pressure chamber C3 is blocked. Then, if the brake pedal BP is depressed further to advance the master piston MP, the simulator chamber C2 will be communicated with the master pressure chamber C1 through the second passage P2.

Thus, the communication between the simulator chamber C2 and the atmospheric pressure chamber C3 is blocked, and instead, the simulator chamber C2 is communicated with the master pressure chamber C1. In this state, as the compression spring R2 is not compressed until the compressive force of the return spring R1 to the master piston MP exceeds the compressive force for mounting the compression spring R2 in the stroke simulator SM, the stroke simulator SM will not provide any stroke. Furthermore, even if the master piston MP is advanced to increase the compressive force of the return spring R1 until it exceeds the compressive force for mounting the compression spring R2, the hydraulic pressure discharged from the simulator chamber C2 will be supplied to the wheel brake cylinder WC through the master pressure chamber C1. In this case, therefore, the stroke of the stroke simulator SM is not served as a so-called dead stroke. Therefore, even if the pressure control device PC came to be abnormal, appropriate braking force could be obtained without increasing the stroke of the brake pedal BP.

According to the present embodiment, therefore, if the cut-off function of the seal member S1 came to be abnormal, the vehicle driver could notice the abnormality when the pressure control device PC is normal. In other words, in the case where the cut-off function of the seal member S1 comes to be abnormal, when the pressure control device PC is normal, even if the brake pedal BP is depressed, and the master piston MP is advanced by the first stroke (d1) from the initial position or more, the communication between the master pressure chamber C1 and the atmospheric pressure chamber C3 will not be blocked. Therefore, even in the case where the switching valve NO is placed in its closed position so that the communication between the master pressure chamber C1 and the wheel brake cylinder WC is blocked, the master pressure chamber C1 will not be closed, so that the master piston MP will be advanced in response to operation of the brake pedal BP. Furthermore, even if the master piston MP is advanced to the position forward of the initial position by a stroke equal to or greater than the second stroke (d2), the communication between the simulator chamber C2 and the atmospheric pressure chamber C3 is not blocked, so that the stroke simulator SM will be actuated to provide a stroke. As a result, when the brake pedal BP is depressed, a greater stroke is provided than the stroke which is provided when the cut-off function of the seal member S1 is normal, whereby the vehicle driver could notice the abnormality, and take necessary actions for repairing it and so on. In this case, as the pressure control device PC is normal, the hydraulic pressure is generated by the pressure control device PC on the basis of the stroke of the brake pedal BP detected by the stroke sensor BS, and supplied to the wheel brake cylinder WC, whereby a desired braking force can be obtained.

Figure 3:
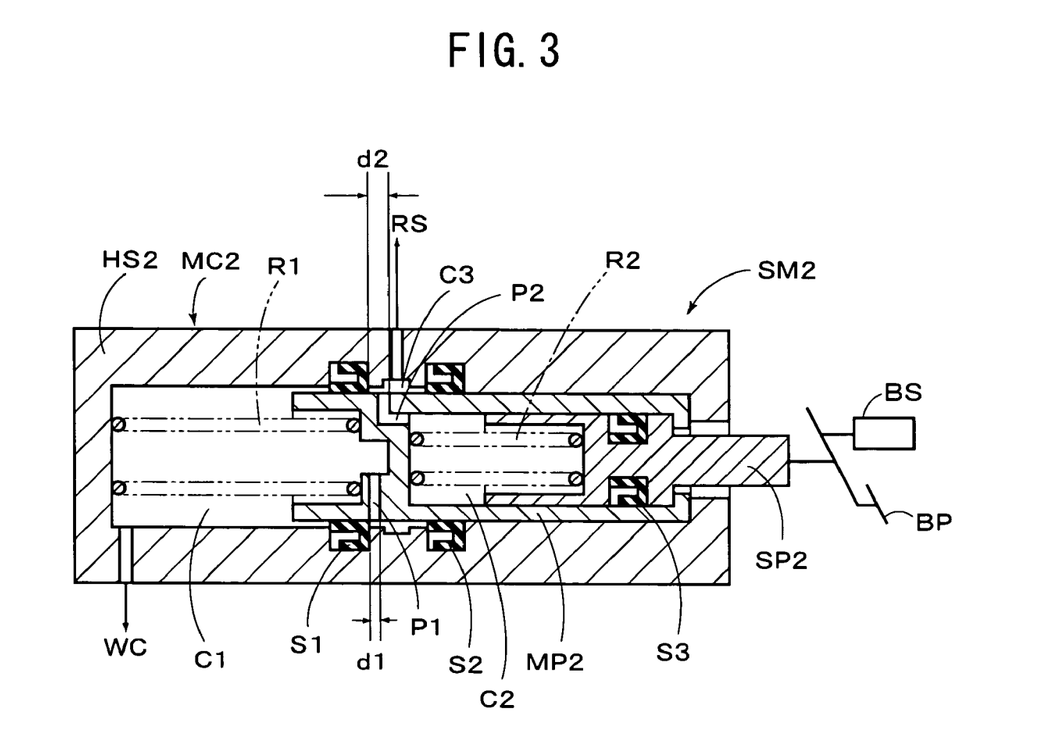
FIG. 3 is a sectional view of a master cylinder with a braking stroke simulator according to another embodiment of the present invention.

Next, another embodiment of the present invention is explained referring to FIG. 3, wherein structural elements equivalent to those described with respect to the master cylinder MC in FIG. 2 are designated by corresponding reference numerals. According to the present embodiment, a master cylinder MC2 is not provided with the simulator piston SP and master piston MP as shown in FIG. 2, but provided with a simulator piston SP2 which is slidably received in a master piston MP2, which is slidably received in a cylinder housing HS2. Therefore, its longitudinal full length is greatly reduced, so that a further minimization of it can be achieved. Instead, an effective cross-sectional area applied with pressure (or, effective diameter which provides the effective cross-sectional area applied with pressure) of the simulator piston SP2 is made smaller than the effective cross-sectional area applied with pressure (or, effective diameter) of the master piston MP2. Further, the rod RD and retainer RT are not installed in the master cylinder MC2.

In the case where the pressure control device PC is normal, the master cylinder MC2 of the present embodiment is operated in the same manner as the master cylinder MC as shown in FIG. 2. In the case where the pressure control device PC comes to be abnormal, when the master piston MP2 is advanced to the position forward of the initial position by a stroke equal to or more than the second stroke (d2), so that the communication between the simulator chamber C2 and the atmospheric pressure chamber C3 is blocked. When the simulator chamber C2 is communicated with the master pressure chamber C1, the compression spring R2 will be compressed to provide a further stroke of the stroke simulator SM2, so that the sum of the result of the difference between the effective cross-sectional areas of the master piston MP2 and simulator piston SP2 multiplied by the pressure in the master pressure chamber C1, and the compressive force of the return spring R1 for the master piston MP2 will become equal to the compressive force of the compression spring R2 for the stroke simulator SM2. In this case, as the hydraulic pressure discharged from the simulator chamber C2 is supplied to the wheel brake cylinder WC through the master pressure chamber C1, the stroke of the stroke simulator SM2 is not served as the dead stroke. Therefore, even if the pressure control device PC came to be abnormal, appropriate braking force could be obtained without increasing the stroke of the brake pedal BP. According to the present embodiment, if the cut-off function of the seal member S1 came to be abnormal, the vehicle driver could notice the abnormality when the pressure control device PC is normal, with a desired braking force maintained, because a greater stroke is provided than the stroke which is provided when the cut-off function of the seal member S1 is normal and when a substantially the same braking force is applied, as described before.

Figure 4:
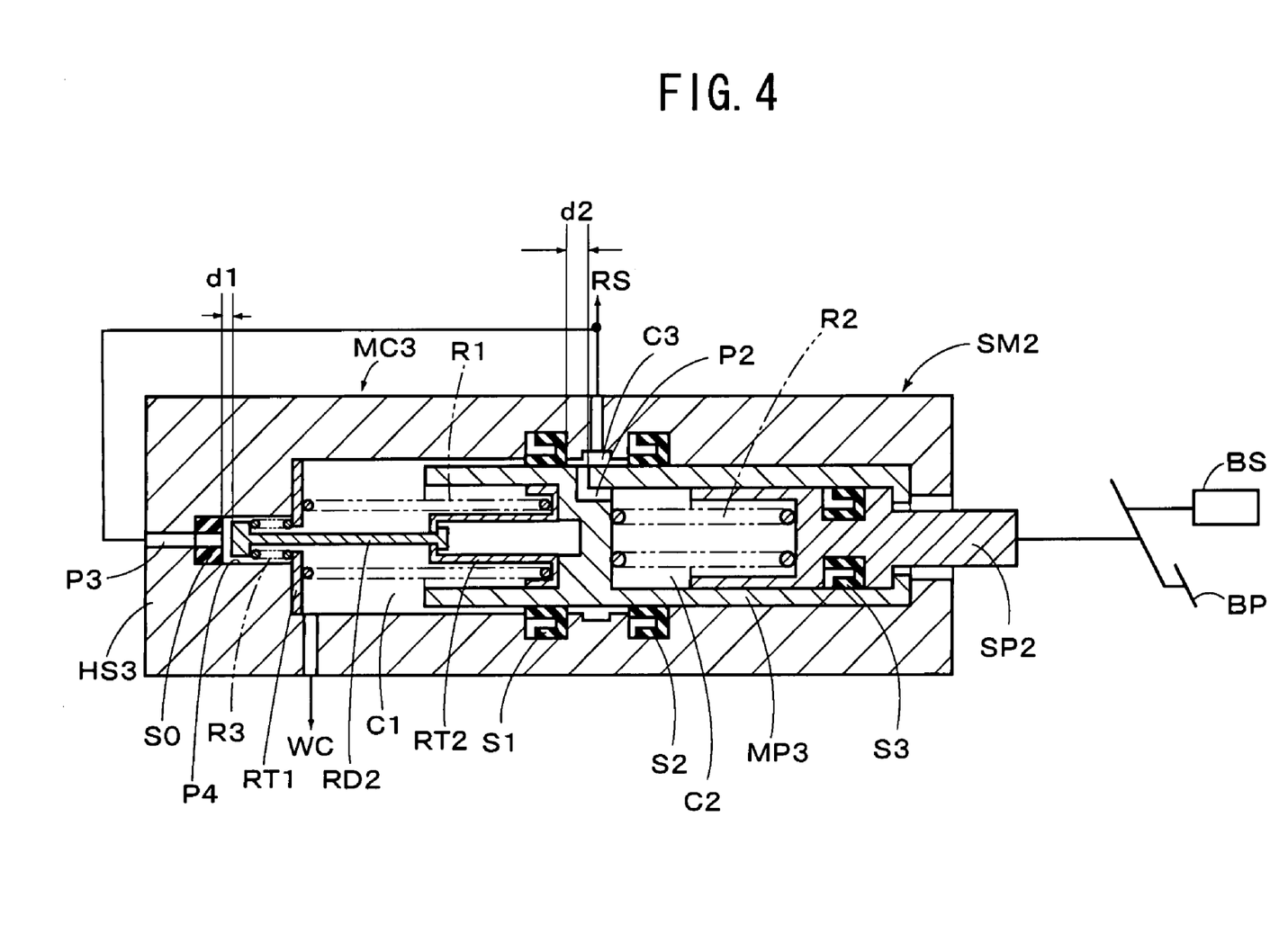
FIG. 4 is a sectional view of a master cylinder with a braking stroke simulator according to a further embodiment of the present invention.

FIG. 4 shows a further embodiment of the present invention, wherein structural elements equivalent to those described with respect to the master cylinder MC2 in FIG. 3 are designated by corresponding reference numerals. According to the present embodiment, a master cylinder MC3 is similar to the structure as shown in FIG. 3, so that it is provided with a simulator piston SP2 which is slidably received in a master piston MP3, and the second passage P2 is formed in the master piston MP3. However, the first passage P1 is not formed, but a cylinder housing HS3 is formed with a passage P3 and a recess P4, which are capable of communicating the master pressure chamber C1 with the reservoir RS, instead of the first passage P1. In the master pressure chamber C1, disposed are front and rear retainers RT1 and RT2, between which the return spring R1 is mounted. Furthermore, a rod RD2 is disposed, with its rear end portion engaged with the rear retainer RT2, and with a compression spring R3 mounted between its front end portion and the front retainer RT1. A cylindrical seal member S0 is fitted into the recess P4, to provide the first stroke (d1) between the cylindrical seal member S0 and the front end portion of the rod RD2.

According to this embodiment, in the case where the pressure control device PC is normal, the master cylinder MC3 operates as follows. When the brake pedal BP is depressed, the braking operation force is transmitted to the master piston MP3 through the simulator piston SP2 and the elastic member (compression spring R2), so that the master piston MP3 is advanced against the biasing force of the return spring R1. When the master piston MP3 is advanced by the first stroke (d1) from the initial position, the opening end of the passage P3 is closed by the front end portion of the rod RD2, so that the communication between the master pressure chamber C1 and the reservoir RS is blocked. Therefore, when the brake pedal BP is depressed further, the hydraulic pressure is generated in the master pressure chamber C1 in response to the braking operation force. In the case where the pressure control device PC comes to be abnormal, for example, when the master piston MP2 is advanced to the position forward of the initial position by a stroke equal to or more than the second stroke (d2), so that the communication between the simulator chamber C2 and the atmospheric pressure chamber C3 is blocked, and further when the simulator chamber C2 is communicated with the master pressure chamber C1, the compression spring R2 will be compressed to provide a further stroke of the stroke simulator SM2, so that the sum of the result of the difference between the effective cross-sectional areas of the master piston MP3 and simulator piston SP2 multiplied by the pressure in the master pressure chamber C1, and the compressive force of the return spring R1 for the master piston MP3 will become equal to the compressive force of the compression spring R2 for the stroke simulator SM2. In this case, as the hydraulic pressure discharged from the simulator chamber C2 is supplied to the wheel brake cylinder WC through the master pressure chamber C1, the stroke of the stroke simulator SM2 is not served as the dead stroke. Therefore, even if the pressure control device PC came to be abnormal, appropriate braking force could be obtained without increasing the stroke of the brake pedal BP. Furthermore, if the cut-off function of the seal member S1 came to be abnormal, the vehicle driver could notice the abnormality when the pressure control device PC is normal, with a desired braking force maintained, because a greater stroke is provided than the stroke which is provided when the cut-off function of the seal member S1 is normal, and when a substantially the same braking force is applied.

Figure 5:
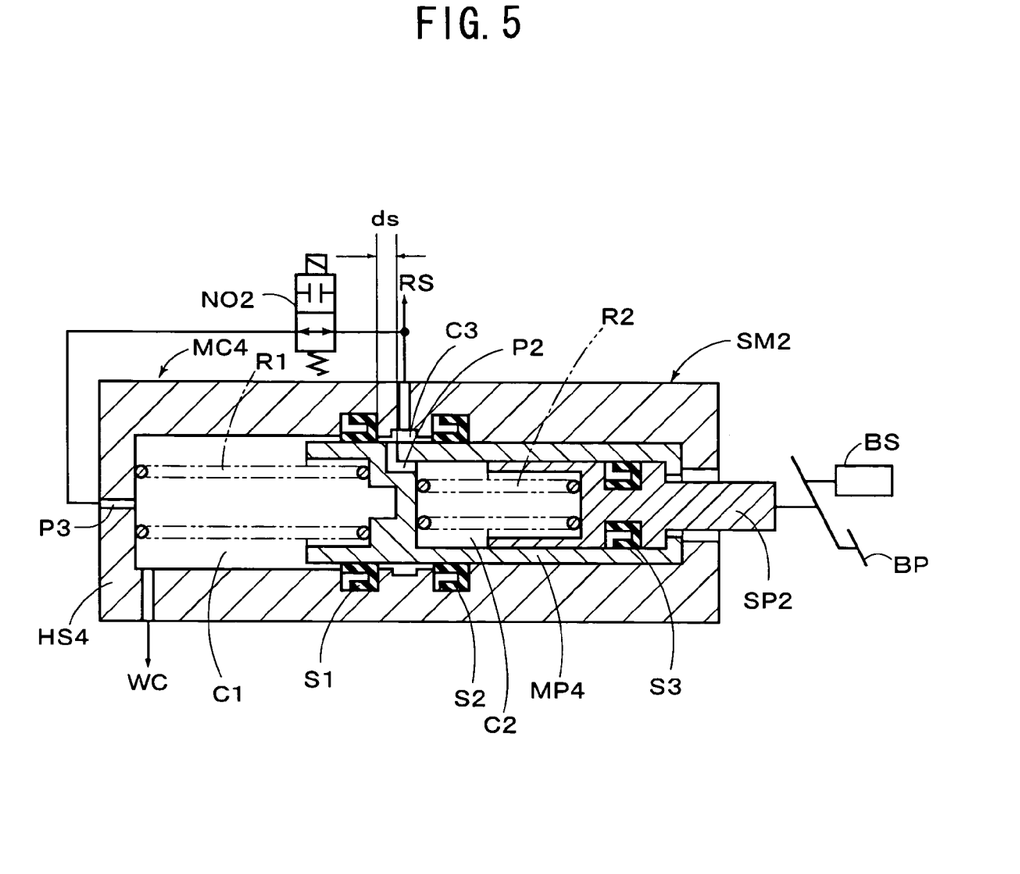
FIG. 5 is a sectional view of a master cylinder with a braking stroke simulator according to a yet further embodiment of the present invention.

FIG. 5 shows a yet further embodiment of the present invention, wherein structural elements equivalent to those described with respect to the master cylinder MC2 in FIG. 3 are designated by corresponding reference numerals. According to the present embodiment, a master cylinder MC4 is similar to the structure as shown in FIG. 3, so that it provided with a simulator piston SP2 which is slidably received in a master piston MP4, and the second passage P2 is formed in the master piston MP4. However, the first passage P1 is not formed, but a cylinder housing HS4 is formed with the passage P3, which is capable of communicating the master pressure chamber C1 with the reservoir RS, in the same manner as the embodiment as shown in FIG. 4. And, a normally open electromagnetic switching valve NO2 is disposed between the passage P3 and the reservoir RS. As the switching valve NO2 is normally placed in its open position and placed in its closed position in response to the stroke of the brake pedal BP, it is not required to provide the first stroke (d1) by means of the seal member S1 and first passage P1 as shown in FIG. 2. According to the present embodiment, therefore, the stroke adjustment will be required only for the predetermined stroke (ds), which is set to be of the same distance as the second stroke (d2) required in the embodiments as described before. As the operation of the present embodiment is substantially the same as that of the embodiment as shown in FIG. 4, explanation of it is omitted herein.

Figure 6:
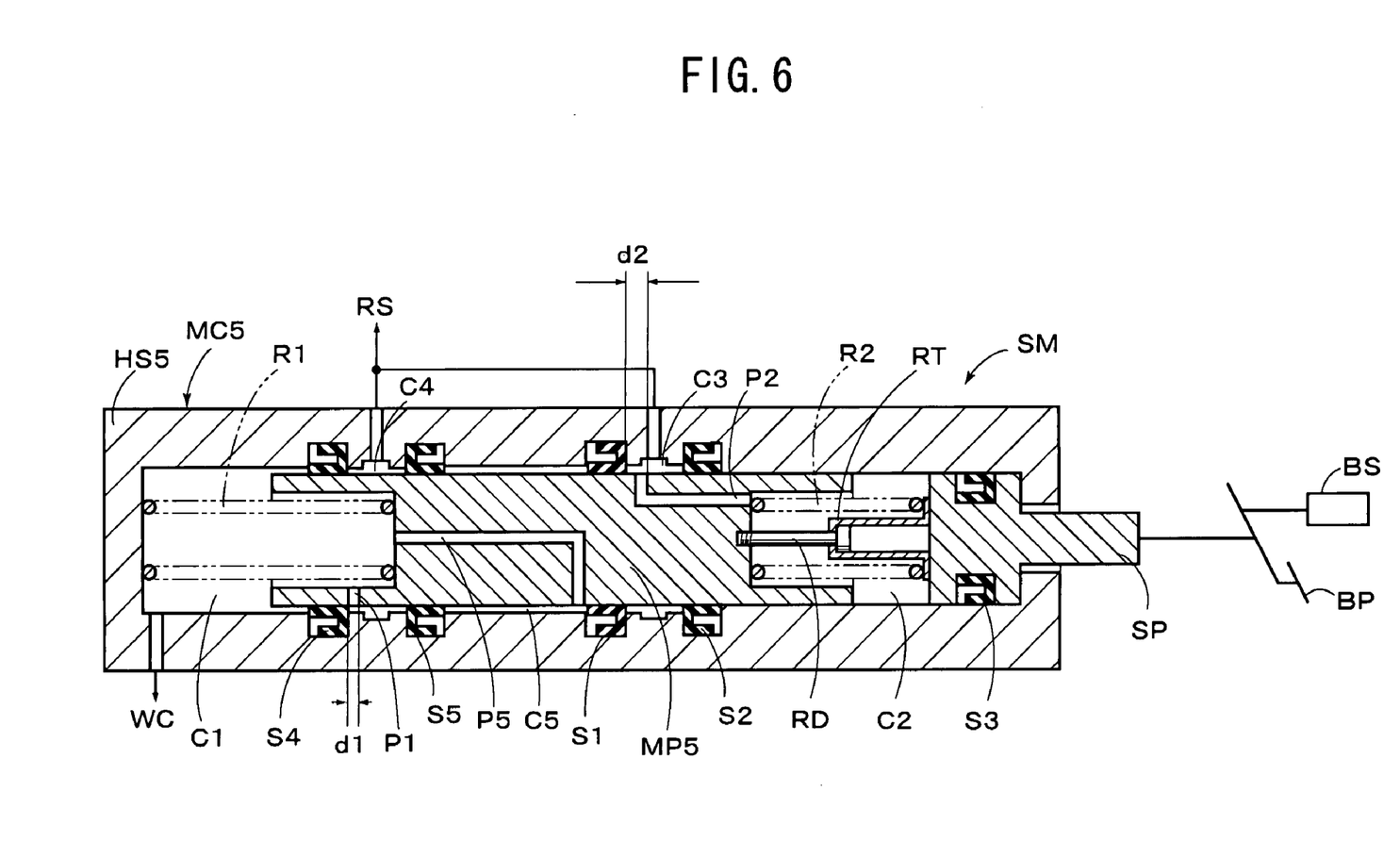
FIG. 6 is a sectional view of a master cylinder with a braking stroke simulator according to a yet further embodiment of the present invention.

FIG. 6 shows a yet further embodiment of the present invention, wherein structural-elements equivalent to those described with respect to the master cylinder MC in FIG. 2 are designated by corresponding reference numerals. According to the present embodiment, the simulator SM is similar to the one as shown in FIG. 2. Also, a master piston MP5 is similar to the master piston MP as shown in FIG. 2, while the master piston MP5 is made relatively long to form an annular chamber C5 between the first passage P1 and second passage P2, so that a cylinder housing HS5 is relatively long. Furthermore, the seal members S4 and S5 are provided for defining an atmospheric pressure chamber C4, which is communicated with the master pressure chamber C1 through the first passage P1. And, the master piston MP5 is formed with a passage P5 which is communicated with the master pressure chamber C1, to be opened at a space between the seal members S1 and S5, so that the annular chamber C5 is always communicated with the master pressure chamber C1. As the operation of the present embodiment is substantially the same as that of the embodiment as shown in FIG. 2, explanation of it is omitted herein.

According to the master cylinder MC or the like in the embodiments as described above, the force for mounting the resilient member (compression spring R2) in the stroke simulator SM or the like has been set to greater than the force of the return spring R1 which is generated when the master piston MP or the like is advanced to the position forward of the initial position by a stroke equal to or more than the second stroke (d2), or the stroke (ds) as shown in FIG. 5. However, the former may be set to be smaller than the latter. In this case, when the pressure control device PC comes to be abnormal, a stroke of the stroke simulator SM or the like is caused before the master piston MP or the like is advanced to the position forward of the initial position by the stroke equal to or more than the second stroke (d2) or the stroke (ds), so that the caused stroke can be the dead stroke. However, after the master piston MP or the like was advanced to the position forward of the initial position by the stroke equal to or more than the stroke (d2 or ds), the stroke simulator SM or the like could be held not to provide its stroke, thereby to prevent the stroke of the brake pedal BP from being increased.

If the second passage P2 is provided with an orifice (not shown) for restricting the brake fluid from being drained from the simulator chamber C2 to the atmospheric pressure chamber C3 when the brake pedal BP is depressed rapidly, the feeling for operating the brake pedal BP can be adjusted. A free piston (not shown) may be disposed in the master pressure chamber C1 to form a tandem master cylinder having a couple of master pressure chambers. Furthermore, by comparing the stroke of the brake pedal BP detected by the stroke sensor BS and the pressure in the master pressure chamber C1 detected by the pressure sensor Smc, it can be detected that the function of the seal member S1 has come to be abnormal. Then, a warning signal may be given to the vehicle driver on the basis of the detected result.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. A master cylinder with a braking stroke simulator operated in response to operation of a manually operated braking member, comprising:
   a master piston slidably accommodated in a housing having an atmospheric pressure chamber defined therein for storing brake fluid under atmospheric pressure, and a master pressure chamber defined in front of said master piston for generating a hydraulic braking pressure;
   a simulator piston slidably accommodated in said housing to define a simulator chamber in front of said simulator piston, and moved back and forth in response to operation of said manually operated braking member;
   an elastic member for applying a stroke of said simulator piston in response to braking operation force applied to said manually operated braking member, to provide said braking stroke simulator together with said simulator piston, said braking stroke simulator transmitting the braking operation force of said manually operated braking member to said master piston through said simulator piston and said elastic member;
   a cut-off seal member disposed in said housing for supporting said master piston therein slidably and fluid-tightly, and placed to be applied with the pressure in said master pressure chamber in front of said cut-off seal member, and applied with the pressure in said atmospheric pressure chamber behind said cut-off seal member; and
   a passage formed in said master piston to communicate said simulator chamber with said atmospheric pressure chamber when said master piston is placed in an initial position thereof, said cut-off seal member being positioned relative to said passage to block the communication between said simulator chamber and said atmospheric pressure chamber, when said master piston is advanced by a predetermined stroke from said initial position or more.

2. A master cylinder with a braking stroke simulator as set forth in claim 1, wherein said simulator piston is slidably received in said master piston to be moved relative thereto.

3. A master cylinder with a braking stroke simulator as set forth in claim 1, wherein said cut-off seal member is placed to define an annular chamber around said master piston in front of said cut-off seal member, said annular chamber being communicated with said master pressure chamber.

4. A master cylinder with a braking stroke simulator operated in response to operation of a manually operated braking member, comprising:
   a master piston slidably accommodated in a housing having an atmospheric pressure chamber defined therein for storing brake fluid under atmospheric pressure, and a master pressure chamber defined in front of said master piston for generating a hydraulic braking pressure;
   a simulator piston slidably accommodated in said housing to define a simulator chamber in front of said simulator piston, and moved back and forth in response to operation of said manually operated braking member;
   an elastic member for applying a stroke of said simulator piston in response to braking operation force applied to said manually operated braking member, to provide said braking stroke simulator together with said simulator piston, said braking stroke simulator transmitting the braking operation force of said manually operated braking member to said master piston through said simulator piston and said elastic member;
   a cut-off seal member disposed in said housing for supporting said master piston therein slidably and fluid-tightly, and placed to be applied with the pressure in said master pressure chamber in front of said cut-off seal member, and applied with the pressure in said atmospheric pressure chamber behind said cut-off seal member;
   a first passage formed in said master piston to communicate said master pressure chamber with said atmospheric pressure chamber when said master piston is placed in an initial position thereof, said cut-off seal member being positioned relative to said first passage to block the communication between said master pressure chamber and said atmospheric pressure chamber, when said master piston is advanced by a first stroke from said initial position or more, and
   a second passage formed in said master piston to communicate said simulator chamber with said atmospheric pressure chamber when said master piston is placed in the initial position thereof, said cut-off seal member being positioned relative to said second passage to block the communication between said simulator chamber and said atmospheric pressure chamber, when said master piston is advanced by a second stroke from said initial position or more, said second stroke being greater than said first stroke.

5. A master cylinder with a braking stroke simulator as set forth in claim 4, wherein said simulator piston is slidably received in said master piston to be moved relative thereto.

* * * * *